United States Patent
Rojahn

(10) Patent No.: US 10,733,640 B2
(45) Date of Patent: Aug. 4, 2020

(54) MATCHING VENDOR OFFERINGS TO SERVICE PROVIDER REQUIREMENTS

(71) Applicant: International Business Machines Corporation, Armonk, NY (US)

(72) Inventor: Tom O. Rojahn, Oslo (NO)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 16/055,264

(22) Filed: Aug. 6, 2018

(65) Prior Publication Data

US 2018/0341994 A1 Nov. 29, 2018

Related U.S. Application Data

(63) Continuation of application No. 11/677,594, filed on Feb. 22, 2007, now Pat. No. 10,108,990.

(30) Foreign Application Priority Data

May 5, 2006 (GB) .................................. 0608926.2

(51) Int. Cl.
*G06Q 30/02* (2012.01)
*G06Q 10/06* (2012.01)
*G06Q 10/10* (2012.01)

(52) U.S. Cl.
CPC ..... *G06Q 30/0282* (2013.01); *G06Q 10/0639* (2013.01); *G06Q 10/10* (2013.01); *G06Q 30/02* (2013.01)

(58) Field of Classification Search
CPC ............... G06Q 10/0639; G06Q 30/02; G06Q 30/0282; G06Q 10/10
See application file for complete search history.

(56) References Cited

U.S. PATENT DOCUMENTS 6,188,403 B1 * 2/2001 Sacerdoti .............. G06T 11/206
715/764
6,249,769 B1 6/2001 Ruffin et al.
(Continued)

FOREIGN PATENT DOCUMENTS

WO WO02061549 8/2002

OTHER PUBLICATIONS http://www2.cs.uregina.ca/~dbd/cs831/notes/dcubes/dcubes.html, as seen on the Way Back Machine on Nov. 6, 2003 (Year: 2003).*
(Continued)

*Primary Examiner* — Carrie S Gilkey
(74) *Attorney, Agent, or Firm* — Schmeiser, Olsen & Watts, LLP; Mark Vallone

(57) ABSTRACT

A method and system for using a graphical user interface for display and navigation of a three-dimensional navigational cube to assess vendors for meeting requirements of a service provider for deploying a selected service. A three-dimensional navigational cube configured to be navigated is generated and displayed. Mutually orthogonal axes of the navigational cube comprise subservices that the service provider must have to implement the selected service, vendors able to implement at least one of the subservices, and requirements stipulated by the service provider that are to be met for implementing the subservices. Selections sequentially received from a user include: one or more planar sections of the navigational cube, a vector of co-linear subcubes within one of the planar sections, and a single subcube within the selected vector which selects a vendor able to meet requirements for implementing the subservice for the selected single subcube.

20 Claims, 10 Drawing Sheets

(56) References Cited

U.S. PATENT DOCUMENTS

| | | | |
|---|---|---|---|
| 7,263,667 B1 | 8/2007 | Hoellerer et al. | |
| 8,713,481 B2 | 4/2014 | Rojahn | |
| 2003/0182413 A1* | 9/2003 | Allen | G06Q 30/06 709/223 |
| 2004/0122820 A1* | 6/2004 | Malloy | G06F 16/2264 |
| 2004/0267554 A1* | 12/2004 | Bowman | G06Q 10/06398 705/321 |
| 2006/0123351 A1 | 6/2006 | Littlefield | |
| 2012/0209656 A1 | 8/2012 | Rojahn | |

OTHER PUBLICATIONS

Office Action (dated Mar. 30, 2010) for U.S. Appl. No. 11/677,594, filed Feb. 22, 2007.
Amendment (dated Jun. 30, 2010) for U.S. Appl. No. 11/677,594, filed Feb. 22, 2007.
Final Office Action (dated Sep. 29, 2010) for U.S. Appl. No. 11/677,594, filed Feb. 22, 2007.
RCE and PA (Nov. 15, 2010) for U.S. Appl. No. 11/677,594, filed Feb. 22, 2007.
Office Action Response filed Mar. 11, 2013 for U.S. Appl. No. 13/456,414, filed Apr. 26, 2012; First Named Inventor: Tom Odd Rojahn; Confirmation No. 5501.
Office Action (dated Aug. 14, 2013) for U.S. Appl. No. 11/677,594, filed Feb. 22, 2007.
Office Action (dated Dec. 13, 2012) for U.S. Appl. No. 13/456,414, filed Apr. 26, 2012; First Named Inventor: Tom Odd Rojahn; Confirmation No. 5501.
Final Office Action (dated Jul. 5, 2013) for U.S. Appl. No. 13/456,414, filed Apr. 26, 2012; First Named Inventor: Tom Odd Rojahn; Confirmation No. 5501.
Notice of Allowance (dated Sep. 16, 2013) for U.S. Appl. No. 13/456,414, filed Apr. 26, 2012; First Named Inventor: Tom Odd Rojahn; Confirmation No. 5501.
CE (filed Nov. 1, 2013) for U.S. Appl. No. 13/456,414, filed Apr. 26, 2012; First Named Inventor: Tom Odd Rojahn; Confirmation No. 5501.
Amendment (dated Nov. 14, 2013) for U.S. Appl. No. 11/677,594, filed Feb. 22, 2007.
Final Office Action (dated Jan. 22, 2014) for U.S. Appl. No. 11/677,594, filed Feb. 22, 2007.
Final Amendment (dated Mar. 21, 2014) for U.S. Appl. No. 11/677,594, filed Feb. 22, 2007.
Advisory (dated Apr. 2, 2014) for U.S. Appl. No. 11/677,594, filed Feb. 22, 2007.
RCE (Apr. 17, 2014) for U.S. Appl. No. 11/677,594, filed Feb. 22, 2007.
Office Action (dated Jan. 13, 2015) for U.S. Appl. No. 11/677,594, filed Feb. 22, 2007.
Amendment (dated Apr. 10, 2015) for U.S. Appl. No. 11/677,594, filed Feb. 22, 2007.
Final Office Action (dated Jun. 24, 2015) for U.S. Appl. No. 11/677,594, filed Feb. 22, 2007.
Final Amendment (dated Aug. 24, 2015) for U.S. Appl. No. 11/677,594, filed Feb. 22, 2007.
http://www2.cs.uregina.ca/-dbd/cs831/notes/dcubes/dcubes.html, as seen on the Way Back Machine on Nov. 6, 2003.
Advisory (dated Sep. 17, 2015) for U.S. Appl. No. 11/677,594, filed Feb. 22, 2007.
RCE (Sep. 24, 2015) for U.S. Appl. No. 11/677,594, filed Feb. 22, 2007.
Office Action (dated Jun. 9, 2016) for U.S. Appl. No. 11/677,594, filed Feb. 22, 2007.
Amendment (dated Sep. 9, 2016) for U.S. Appl. No. 11/677,594, filed Feb. 22, 2007.
Final Office Action (dated Nov. 23, 2016) for U.S. Appl. No. 11/677,594, filed Feb. 22, 2007.
Final Amendment (dated Jan. 23, 2017) for U.S. Appl. No. 11/677,594, filed Feb. 22, 2007.
Advisory (dated Feb. 14, 2017) for U.S. Appl. No. 11/677,594, filed Feb. 22, 2007.
RCE and PA (Feb. 23, 2017) for U.S. Appl. No. 11/677,594, filed Feb. 22, 2007.
Office Action (dated Jun. 20, 2017) for U.S. Appl. No. 11/677,594, filed Feb. 22, 2007.
Amendment (dated Sep. 20, 2017) for U.S. Appl. No. 11/677,594, filed Feb. 22, 2007.
Final Office Action (dated Dec. 4, 2017) for U.S. Appl. No. 11/677,594, filed Feb. 22, 2007.
Final Amendment (dated Feb. 5, 2018) for U.S. Appl. No. 11/677,594, filed Feb. 22, 2007.
Notice of Allowance (dated Jun. 6, 2018) for U.S. Appl. No. 11/677,594, filed Feb. 22, 2007.

* cited by examiner

MATCHING VENDOR OFFERINGS TO SERVICE PROVIDER REQUIREMENTS

This application is a continuation application claiming priority to Ser. No. 11/677,594, filed Feb. 22, 2007.

FIELD OF THE INVENTION

The invention relates to the field of consulting assessment methodologies and tools and in particular, the invention relates to an assessment methodology for matching vendor offerings to service provider requirements.

BACKGROUND OF THE INVENTION

In order to offer a service to customers it is vital to understand which technological requirements are essential for implementing the service. Once the technological requirements have been understood, vendors need to be located in order to provide the service provider with the capabilities that are required to do the job.

Often, the process of finding suppliers, partners or vendors is a laborious task. For example, is it advisable to select the vendor that was previously used on a project and is trusted, even though they might not have the right skills for the job—or alternatively, should a vendor be selected because the vendor is cheaper than another?

Thus, there are many factors to take into account when trying to deploy a new service for the first time. Traditionally, the way to solve this problem has been to employ a number of consultants. A consultant may represent a company (Company A) and hence the consultant will provide advice and guidance with respect to the services and goods of the company that the consultant represents. However, the consultant's company may be 'tied into' particular third party products and services; i.e., the company has agreements with third parties for the supply of goods and services, and hence the third parties goods and services may not give the flexibility and versatility required, but the price offered by Company A may be very good. Hence a decision has to be made as to whether flexibility and versatility are to be sacrificed over price. The solution often is to find another consultant who will give a recommendation about their own company (company B) and thus the process starts again until the end results is a number of recommendations by different consultants with often conflicting views and products.

Hence, there is a need for a method and system for finding suppliers, partners, vendors, etc. that overcomes at least one of the aforementioned prevailing difficulties.

SUMMARY OF THE INVENTION

The present invention provides a method for assessing vendors of varying capability for meeting requirements of a service provider for deploying a selected service in a service delivery environment, said method being implemented by execution of program code by a processor of a computer system, said method comprising:

receiving a request from a service provider requesting the identification of at least one vendor who can meet the service provider's requirements for deploying the selected service;

identifying a plurality of subservices that the service provider must have in order to implement the requested service;

identifying a plurality of vendors, each vendor being able to implement at least one subservice of the plurality of subservices;

identifying a plurality of requirements to be met for implementing each subservice of the plurality of subservices; and for each vendor: determining an indication of whether said each vendor is able or unable to meet each requirement for implementing each subservice and storing said indication in a data store of the computer system.

The present invention provides a computer system comprising a processor and a computer readable memory unit coupled to the processor, said memory unit containing software code portions that when executed by the processor implement a method for assessing vendors of varying capability for meeting requirements of a service provider for deploying a selected service in a service delivery environment, said method comprising:

receiving a request from a service provider requesting the identification of at least one vendor who can meet the service provider's requirements for deploying the selected service;

identifying a plurality of subservices that the service provider must have in order to implement the requested service;

identifying a plurality of vendors, each vendor being able to implement at least one subservice of the plurality of subservices;

identifying a plurality of requirements to be met for implementing each subservice of the plurality of subservices; and for each vendor: determining an indication of whether said each vendor is able or unable to meet each requirement for implementing each subservice and storing said indication in a data store of the computer system.

The present invention provides a computer program product loadable into an internal memory of a computer system, comprising software code portions for performing, when said software code portions are executed on a processor of the computer system, a method for assessing vendors of varying capability for meeting requirements of a service provider for deploying a selected service in a service delivery environment, said method comprising:

receiving a request from a service provider requesting the identification of at least one vendor who can meet the service provider's requirements for deploying the selected service;

identifying a plurality of subservices that the service provider must have in order to implement the requested service;

identifying a plurality of vendors, each vendor being able to implement at least one subservice of the plurality of subservices;

identifying a plurality of requirements to be met for implementing each subservice of the plurality of subservices; and for each vendor: determining an indication of whether said each vendor is able or unable to meet each requirement for implementing each subservice and storing said indication in a data store of the computer system.

The present invention provides a method for providing a vendor assessment service to a service provider to enable the service provider to select at least one vendor for meeting requirements of the service provider for deploying a selected service in a service delivery environment, said method being implemented by execution of program code by a processor of a computer system, said method comprising receiving a request from a service provider requesting the identification of at least one vendor who can meet the service provider's requirements for deploying the selected service;

identifying a plurality of subservices that the service provider must have in order to implement the requested service;

identifying a plurality of vendors, each vendor being able to implement at least one subservice of the plurality of subservices;

identifying a plurality of requirements to be met for implementing each subservice of the plurality of subservices; and for each vendor: determining an indication of whether said each vendor is able or unable to meet each requirement for implementing each subservice and storing said indication in a data store of the computer system.

The preset invention provides a three-dimensional navigational cube being displayed on a display device of a computer system, said navigational cube comprising a three-dimensional configuration having mutually orthogonal axes that include a first axis, a second axis, and a third axis;

wherein the navigational cube is configured to be navigated for use by a service provider to enable the service provider to select at least one vendor for meeting requirements of the service provider for deploying a selected service in a service delivery environment;

wherein a plurality of subservices of the selected service, a plurality of vendors, and a plurality of requirements are respectively represented on the first axis, the second axis, and the third axis to define elements at each unique combination of subservice, vendor, and requirement;

wherein each element is transparent or non-transparent such that the navigational cube comprises a a plurality of transparent elements and a plurality of non-transparent elements;

wherein each transparent element denotes an indication that said each vendor is unable to meet said each requirement for implementing said each subservice; and wherein each non-transparent element denotes an indication that said each vendor is able to meet said each requirement for implementing said each subservice.

The present invention provides a method and system for finding suppliers, partners, vendors, etc. that overcomes at least one of the prevailing difficulties in the prior art.

DETAILED DESCRIPTION OF THE INVENTION

Figure 1:
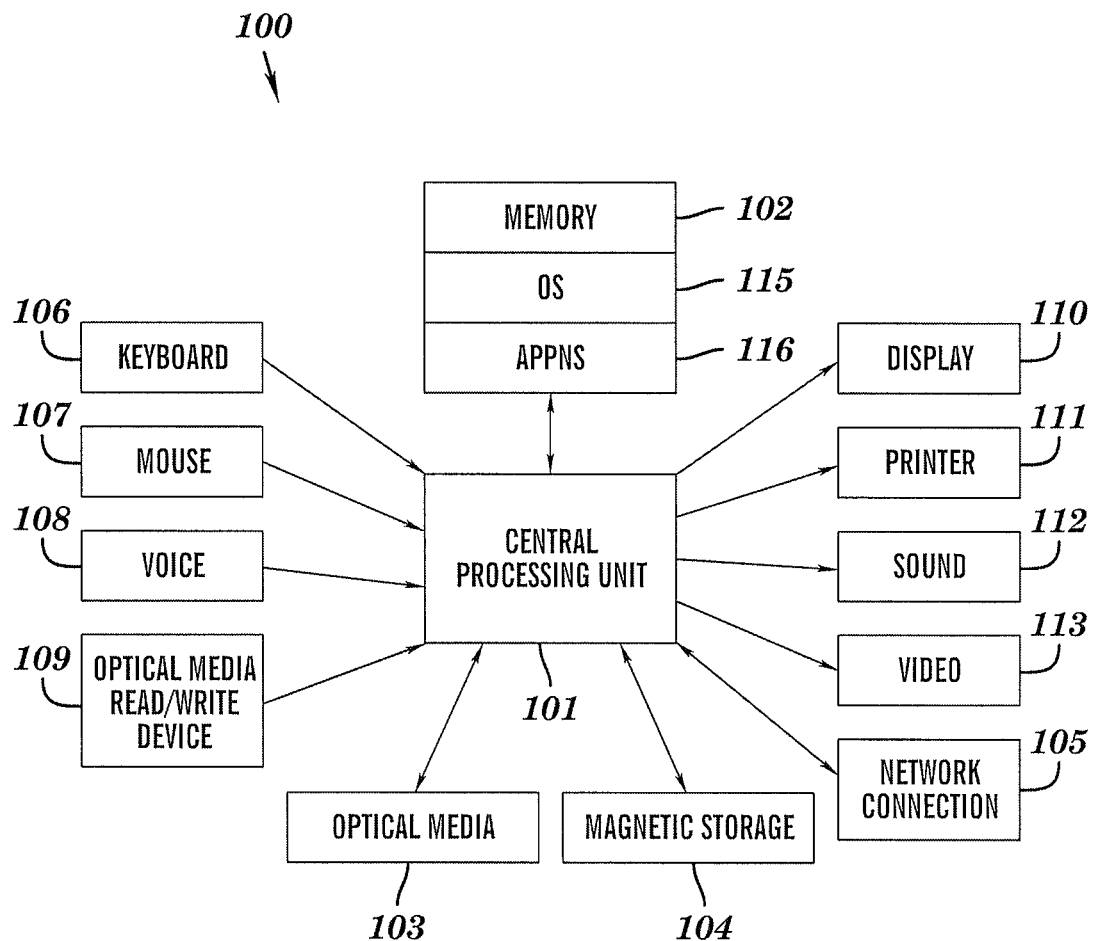
FIG. 1 is a block diagram showing a known computer system in which the present invention may be implemented.

Viewed from a first aspect, the present invention provides an assessment method for determining a match of vendor offerings to service provider requirements in a service delivery environment. The assessment method comprises of: receiving a request from a service provider requesting the identification of a vendor who can meet the service provider's requirements for deploying a selected service; identifying a technology component required to deploy the selected service; determining for the identified technology component a requirement to be met in deploying the technology component; performing an impact assessment to determine the impact of the requirement against a vendor identified as offering the identified technology component; and determining if the identified vendor meets the service provider's requirements, in dependence of the performed impact assessment.

Performing the impact assessment may comprise performing an impact assessment on each vendor identified as offering the service.

Determining whether the identified vendor meets the service provider's requirements may comprise generating a list identifying each of the vendors meeting the service provider's requirements. Generating the list may comprise assigning a weighting to each of the vendors in order to rank the vendors by their suitability.

Performing an impact assessment may comprise performing an impact assessment on the identified technology component. The impact assessment may comprise assessing business metrics to determine the impact on the requester's business of implementing the selected service.

Performing an impact assessment may comprise deriving an absolute score index indicative of the importance of deploying the service against the requirement drivers and a vendor.

The assessment may comprise determining at least one subservice which is required to deploy the requested service.

Performing an impact assessment further may comprise determining the vendor's suitability of providing the selected service.

The present invention provides a visualization component for viewing and navigating the impact assessment, the selected service, the list of identified vendors, and the at least one requirement driver in a three-dimensional view.

Viewed from a second aspect, the present invention provides an assessment component for determining a match of vendor offerings to service provider requirements in a service delivery environment, the assessment component comprising: a receiving component for receiving a request from a service provider requesting the identification of a vendor who can meet the service provider's requirements for deploying a selected service; an assessment engine for identifying a technology component required to deploy the selected service; the assessment engine determining for the identified technology component a requirement driver to be met in deploying the technology component; the assessment engine performing an impact assessment to determine the impact of the requirement driver against a list of vendors identified as offering the technology component; and the assessment engine determining if the identified vendor meets the service providers requirements, in dependence of the performed impact assessment.

The assessment engine may comprise performing an impact assessment on each vendor identified as offering the service.

An assessment engine may generate a list identifying each of the vendors meeting the service provider's requirements.

The impact assessment may be performed on each of the vendors identified in the list of vendors.

An assessment component may perform an impact assessment on identified technology components.

The impact assessment may assess business metrics to determine the impact on the requester's business of implementing the selected service.

The assessment component may derive an absolute score index indicative of the importance of deploying the service against the requirement drivers and a vendor.

The assessment component may comprise determining at least one subservice which is required to deploy the requested service.

Performing an impact assessment may comprise determining the vendor's suitability of providing the selected service.

The present invention provides a visualization component for viewing and navigating the impact assessment, the selected service, the at least one identified vendor, and the at least one requirement driver in a three-dimensional view.

Viewed from a third aspect, the present invention provides a data processing system for determining a match of vendor offerings to service provider requirements in a service delivery environment, the data processing system comprising: a central processing unit, a memory device and a storage device adapted for carrying out the invention as described supra.

Viewed from a fourth aspect, the present invention provides a navigation cube for navigating three dimensional data in a data processing system, the navigation cube comprising: means for receiving an instruction from a user to select an engagement set, the engagement set comprising data indicative of a selected service and identified service providers providing the selected service; means for receiving at least one requirement driver which must be met in order to deploy the selected service; means for receiving an impact assessment data set performed on the engagement set and the at least one requirement driver; and means for displaying the impact assessment data set along with the selected service, the at least one identified service provider and the at least one requirement driver in a three-dimensional view.

Viewed from a fifth aspect, the present invention provides a computer program product loadable into the internal memory of a computer system, comprising software code portions for performing, when said software code portions are executed on a processor of the computer system a method for carrying out the present invention.

Viewed from a sixth aspect, the present invention provides a service for assessing a match of vendor offerings to service provider requirements in a service delivery environment, the assessment method comprising: receiving a request from a service provider requesting the identification of a vendor who can meet the service provider's requirements for deploying a selected service; identifying a technology component required to deploy the selected service; determining for the identified technology component a requirement to be met in deploying the technology component; performing an impact assessment to determine the impact of the requirement against a vendor identified as offering the identified technology component; and determining if the identified vendor meets the service providers requirements, in dependence of the performed impact assessment.

Referring to FIG. 1, a computer system 100 is shown in which embodiments of the present invention may be implemented. The computer system 100 has a processor, namely a central processing unit 101, with primary storage in the form of memory 102 (RAM and ROM). The memory 102 stores an operating system 115, programs such as applications 116, and program information and data acted on or created by the programs. The program information includes the operating system code for the computer system 100 and application code for applications running on the processor of the computer system 100. Secondary storage includes optical disk storage 103 and magnetic disk storage 104. Data and program information can also be stored and accessed from the secondary storage. The RAM, ROM, and secondary storage are computer readable memory units into which software code portions may be stored, said software code portions capable of being executed by the processor of the computer system 100 to perform the methods of the present invention.

The computer system 100 includes a network connection means 105 for interfacing the computer system 100 to a network such as a local area network (LAN) or the Internet. The computer system 100 may also have other external source communication means such as a fax modem or telephone connection.

The central processing unit 101 comprises inputs in the form of, as examples, a keyboard 106, a mouse 107, voice input 108, and a scanner 109 for inputting text, images, graphics or the like. Outputs from the central processing unit 100 may include a display means 110 (e.g., a display device such as a display on a computer screen), a printer 111, sound output 112, video output 113, etc.

In a distributed system, a computer system 100 as shown in FIG. 1 may be connected via a network connection 105 to a server (not shown) on which applications may be run remotely from the central processing unit 101 which is then referred to as a client system.

Applications may run on the computer system 100 from a storage means 103, 104 or via a network connection 105 which may include spread sheet applications, database applications and other storage and retrieval mechanisms.

Figure 2:
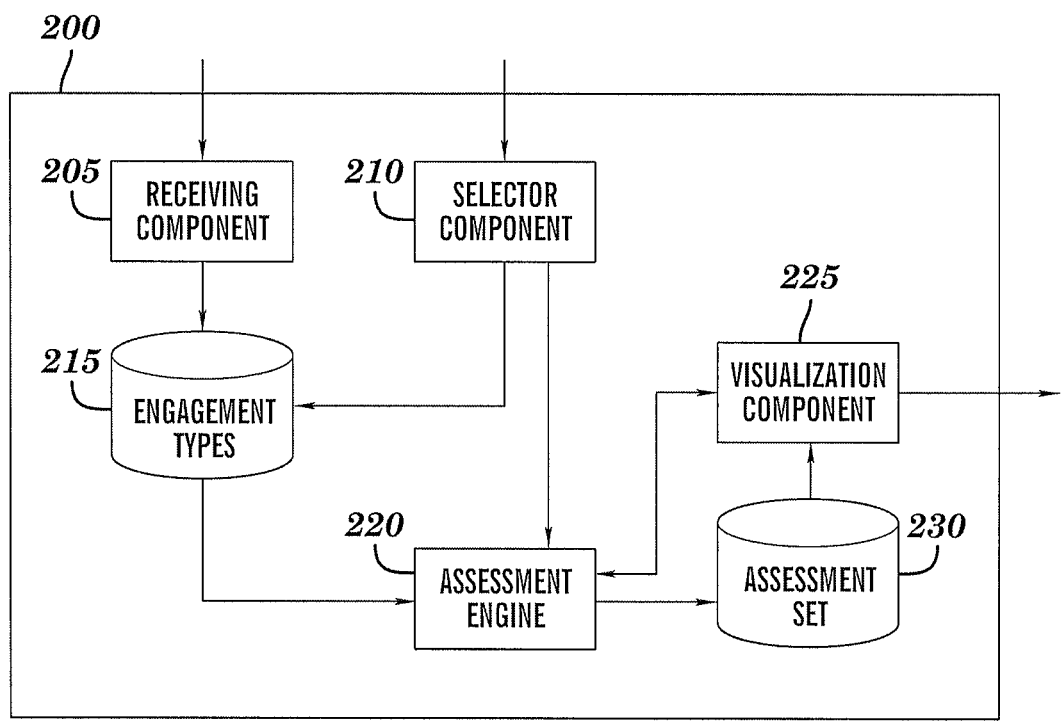
FIG. 2 is a block diagram showing the components of the assessment component of an embodiment of the present invention.

FIG. 2 shows the components of an embodiment of the present invention. The present invention provides an assessment component 200 for determining a suitable match of vendors to requirements stipulated by a service provider. The assessment component 200 may be located on the computer system 100 of FIG. 1 for accessing locally by the computer system 100 or alternatively, the assessment component 200 may be installed on a server (not shown) for accessing the assessment component via the network connection 105. It should be understood that the term vendor is meant to comprise any party offering services and/or technology.

The assessment component 200 may be installed as part of an 'add on' to existing consultancy tools or as part of an existing consultancy tool suite.

The assessment component 200 comprises a number of subcomponents which interface and interact with each other in order to analyze a service provider's requirements and to determine the most suitably matched vendors. The subcomponents comprise a receiving component 205, a selector component 210, a visualization component 225, an assessment engine 220, a first data store 215 comprising sets of engagements types and a second data store 230 comprising the output of the assessment component 200 in the form of an assessment set. The data store 215 and the data store 230 may each be in RAM, ROM, the optical disk storage 103, the magnetic disk storage 104, etc. (see FIG. 1). Each of these subcomponents will now be explained in turn.

The receiving component 205 receives data inputs for populating the data store 215. The data is in the form of data concerning types of services. Also, for each service the subservices required to implement the service and for each subservice, the vendors offering the subservice and the particular capabilities of each of the vendors. For clarity it is to be understood that a vendor is any third party who provides services and/or technology. An example of the data structure is as follows in Table 1.

TABLE 1

| Service | Subservices | Vendor and/or partner | Capabilities |
|---|---|---|---|
| Triple play | ISP-portal | Company A | Supports standard x |
| | | Company B | |
| | | Company C | |
| | | Company D | |
| | Mail services | Company A | |
| | | Company B | |
| | IPTV-portal | Company D | |
| | | Company C | |
| | Video-on-demand | Company A | With a response time of X number of seconds |
| | | Company B | |
| | | Company C | |
| | | Company D | |
| | Personal Video Recorder | Company D | |
| | | Company E | |
| | | Company G | |
| | | Company B | |
| | TV head-end | Company H | |
| | | Company A | |
| | | Company E | |

Figure 3:
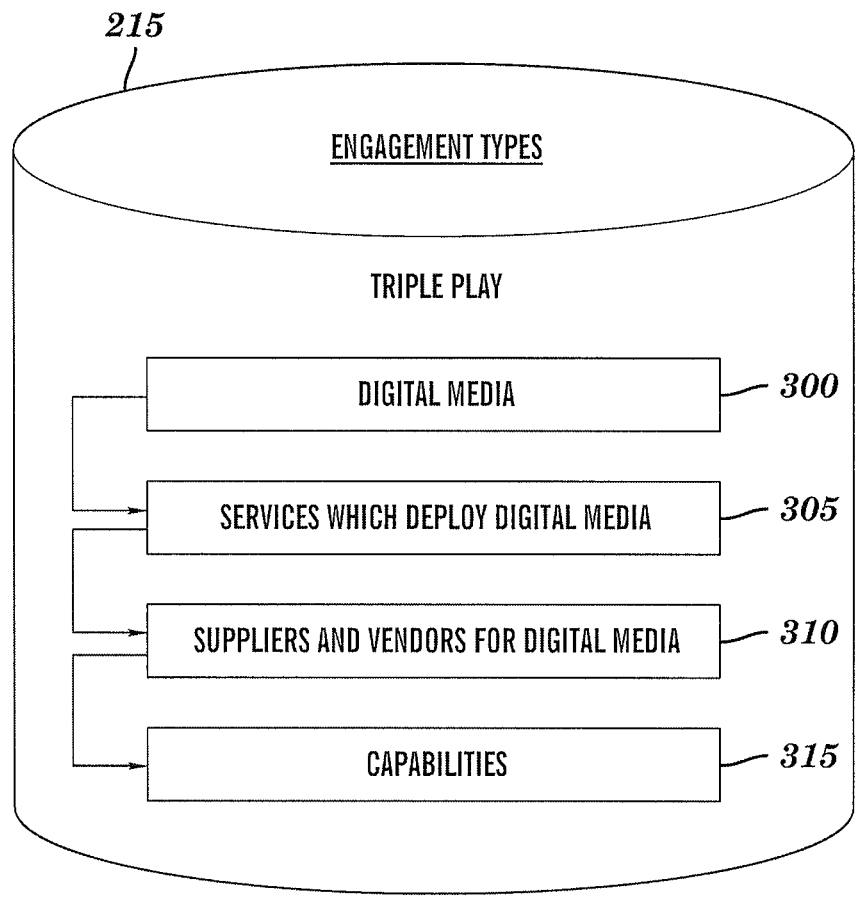
FIG. 3 is a block diagram showing an example of an engagement type data set of an embodiment of the present invention.

This data is stored in the data store 215 for interfacing with the selector component 210. FIG. 3 also details the engagement type data as stored in the data store 215. FIG. 3 shows that for a digital media engagement type, the data store will store information regarding the services 305 needed to deploy a digital media solution 300, the suppliers and/or vendors 310 offering digital media solutions 300, and the capabilities of each of the suppliers and/or vendors 315.

Returning to FIG. 2, the selector component 210 is a selecting function which allows a user to select from a list, the type or solution the service provider wishes to deploy. The user may be the service provider or one who is acting on behalf of the service provider. For example, the service provider may be a telecommunication service provider wishing to deploy a triple play service; i.e., an integrated voice, video and data-IP solution to their customers, or a service provider wishing to deploy a biometric solution (fingerprint or retina scanning and recognition solution) to a specific customer base.

The selector component 210 receives the selection from the user and performs a lookup in the data store to locate the subservices required to deploy the service and the vendors who are able to supply the subservice. The user is also presented with the capabilities of the vendor's goods and services. Once the selector component 210 has performed a lookup in the data store 215 and retrieved the relevant information, a trigger is sent to the assessment engine 220 requesting the assessment engine 220 to perform an assessment on the engagement set 215.

The assessment engine 220 begins by displaying to the user via the visualization component 225, a series of questions in order to gather facts about the user's business in order to perform a 'Where-to-go assessment'. The purpose of the 'where-to-go assessment' is to work through each of the subservices associated with the requestor's service they wish to deploy in order to assess the requestor's current position with respect to the implementation of the subservice and where the user wishes to be with the subservice or technology according to their strategy and business propositions. For each subservice the user is asked to supply information about whether the business already has the subservice. For example, if the subservice is an IPTV portal—the user is asked whether they already have an implemented IPTV portal. If the answer is 'no', and this subservice is vital to the implementation of the user's triple play service—the assessment engine 220 assigns a rating to the IPTV subservice of, for example, 2—indicating that this is a subservice that the user 'must have' in order to implement the service. The assessment engine 220 performs this assessment for each subservice identified by the selector component 210. The output of the assessment is a list of 'must have services and/or technologies' and is stored in the assessment set data store 230.

The assessment engine 220 performs an impact assessment on each of the identified 'must have subservices and/or technologies'. The assessment engine 220 uses a number of criteria to determine an assessment score for each 'must have' subservice. For example, the criteria may be as follows: Investment; Operational costs; Involves more than one part (complex project management); Personnel; Complexity; Branding exposure; Value for customer; Assumed ROI (length); Customer demand (assumed).

Thus, for each 'must have' a determination is made as to what the impact of implementing the subservice would be on a specified criteria (e.g., low, medium or high impact) as is shown for an example in Table 2 below.

TABLE 2

| Criteria | Impact |
|---|---|
| Investment | High |
| Operational costs | Medium |
| Complex project management | High |
| Personnel | Medium |
| Complexity | Low |
| Branding exposure | Medium |
| Value for customer | High |
| Assumed ROI (length) | Low |
| Customer demand (assumed) | High |

As a series of criterion is being assessed, it is noted that the different criterion will have a different importance factor for different requestors. Thus the assessment engine 220 determines a weighting factor indicative of the importance to the requestor of the assessment criteria. This is shown in the Table 3 below.

TABLE 3

| Criteria | Impact | Weighting |
|---|---|---|
| Investment | High | High |
| Operational costs | Medium | Medium |
| Complex project management | High | Low |
| Personnel | Medium | High |
| Complexity | Low | Low |
| Branding exposure | Medium | Low |
| Value for customer | High | High |

TABLE 3-continued

| Criteria | Impact | Weighting |
|---|---|---|
| Assumed ROI (length) | Low | High |
| Customer demand (assumed) | High | High |

The assessment engine 220, for each assessed criteria, multiplies the impact score by the weighting to derive an absolute score index. The assessment engine 220 adds each of the absolute score indexes together to derive a total impact assessment score. The total impact assessment score is stored in the data store as part of the impact assessment 410.

Each Impact factor and Weighting factor in Table 3 has an associated numerical value. For example, High, Medium, Low for the Impact factors may have have an associated numerical value of 3, 2, 1, respectively, and High, Medium, Low for the Weighting factors may have have an associated numerical value of 5, 3, 1, respectively. For, the preceding exemplary numerical values of the Impact factors and the Weighting factors, the total absolute scores are 15 (Investment), 6 (Operational Costs), 3 (Complex project management), 10 (Personnel), 1 (Complexity), 2 (Branding exposure), 15 (Value for customer), 5 (Assumed ROI), 15 (Customer demand), and the total impact assessment score is 72.

The impact on the individual criteria (such as the individual impacts on the impact criteria listed in Table 3) and the total impact assessment score each constitute a measure of impact on the specified criteria of implementing the subservice.

Using the above scoring system—the lower the total absolute score the better. However using a different scoring scheme it will be appreciated by a person skilled in the art that other forms and variation of the above can be contemplated without departing from the scope of the invention.

The assessment engine 220 also performs an impact assessment on the partners and vendors which the selection component 210 identified as offering the identified subservices. For example, if the subservice is an IPTV portal, then company A, B and C may be identified as providers of an IPTV portal. For each identified supplier/vendor an impact assessment is performed by the assessment engine 220. Firstly, the assessment engine 220 performs a 'where to go' assessment and identifies the suppliers and/or vendors that the user wishes to provide their 'must have' service. The selected preferred suppliers or vendors are added to a preference list and stored in the suppliers and vendors assessment data set in the data store 405.

The assessment engine 220 determines, via information received from the user as specified by the service provider, a target assessment of an ideal supplier and/or vendor; i.e. rating most important characteristic that the service provider would like a vendor/supplier to have in terms of specified criteria.

An example of vendor targets is shown for specified vendor assessment criteria in the Table 4 below for the vendor denoted as Company A with respect to the subservice of IPTV-portal.

Partner/Vendor Strategy
Subservice: IPTV-portal
Company: A

TABLE 4

| Criteria | Target |
|---|---|
| Completeness of the service/delivery | High |
| Competence | High |
| Service and support | High |
| Price | High |
| Reputation/image/brand | High |
| References | High |
| Relations to client | High |
| Future presence | High |
| Standards and openness | High |

The assessment engine 220 proceeds to carry out an actual assessment of each potential vendor of the specific service or technology, for example IPTV, against the assigned rating of an ideal vendor. The actual assessment determines how far away the potential vendor is in reaching the criterion with respect to the 'must have' service or technology. The assessment engine 220 prompts the user, via the visualization component 225, to enter a value against each criterion to indicate how far away the potential supplier/vendor is from the ideal supplier/vendor.

An example is shown in Table 5 below.

TABLE 5

| Criteria | Target | Actual |
|---|---|---|
| Completeness of the service/delivery | High | High |
| Competence | High | High |
| Service and support | High | High |
| Price | High | Medium |
| Reputation/image/brand | High | High |
| References | High | Low |
| Relations to client | High | High |
| Future presence | High | Low |
| Standards and openness | High | Low |

Next, the assessment engine 220, via the visualization component 225, prompts the user to enter a weighting score for each of the criterion in order to differentiate between each criterion and the partner/vendor being assessed. An example is shown in Table 6 below.

TABLE 6

| Criteria | Target | Actual | Weight |
|---|---|---|---|
| Completeness of the service/delivery | High | High | Low |
| Competence | High | High | Low |
| Service and support | High | High | Medium |
| Price | High | Medium | High |
| Reputation/image/brand | High | High | Medium |
| References | High | Low | Low |
| Relations to client | High | High | Low |
| Future presence | High | Low | Medium |
| Standards and openness | High | Low | Medium |

Next, the assessment engine 220 determines an absolute score index that reflects how well the supplier or vendor complies with the ideal partner or vendor and the assessed importance of each assessment criteria. The Target score, Actual score, and Weight of High, Medium, and Low in Table 6 have associated numerical values. To determine the absolute score index, the assessment engine 220 takes the actual score for each assessment criterion and subtracts the actual score for each assessment criterion from the target score for each assessment criterion. Then, for each score, the weight given to each assessment criterion is multiplied by the calculated score thus deriving an absolute score index of each assessment criteria. This calculation may yield negative values for the absolute score index if the assessed partner or vendor scores higher than the target. For each vendor or supplier, the absolute score indexes of the assessment criteria are added together to determine a total vendor assessment score which is stored for each vendor or supplier in the vendors assessment set 405 of FIG. 4.

The absolute score indexes and the total vendor assessment score each constitute a measure of an extent to which each vendor is able to meet specified targets for specified vendor assessment criteria pertaining to each subservice.

Lastly, the assessment engine 220 assesses the requirements of each of the 'must have service and/or technologies'. Most of these requirements will be non-functional requirements represented by a single figure, for example, a requirement that the service must support 10,000 users. Other requirements may be of a binary nature, for example, does the vendor support MPEG2—yes or no?

The requirements assessment is performed in two stages, firstly a 'where-to-go' assessment is carried out by documenting the client's target criterion—i.e. MPEG2 must be supported—yes or no? If the answer is determined as 'yes'—the client's target criterion is given a weighting of 'high' to indicate that this is a must have technology requirement. Secondly, the client is asked to 'weight' the importance of the 'must have' technology requirement, for example, as a high, medium or low importance. This two stage assessment is carried out for each requirement listed or selected via the client.

For example in Table 7.

TABLE 7

| Requirement | Score | Target | Weight | Ref | Target date |
|---|---|---|---|---|---|
| MPEG2 | 2 | 2 | 2 | CIO | 4Q |
| No. of users or households | 1 | 10,000 | 3 | CIO | 4Q |

The final step is to set scores for each requirement and vendor. For each short listed vendor a score is provided representing this vendor's actual capability. For example, if a particular vendor is able to meet the requirement, the vendor is assigned a score of, for example, 2. However, if the vendor is only able to partially meet the requirements, the vendor will be assigned a score of, for example, 1 etc.

As previously explained, the weighting of for the target requirement may be represented by a score in a simple 'yes' or 'no' format or it can be a non-functional requirement for example, the number of users per household. For this reason these values cannot determine the best possible mix of services and partner or vendor for each requirement. If any assessments of these requirement drivers have been carried out before for the same service or technology in the same engagement set for the same partner or vendor, the score can be reused by extracting them out of the assessment set. The assessed weights will normally not be reused as they typically will be specific for each client.

Figure 4:
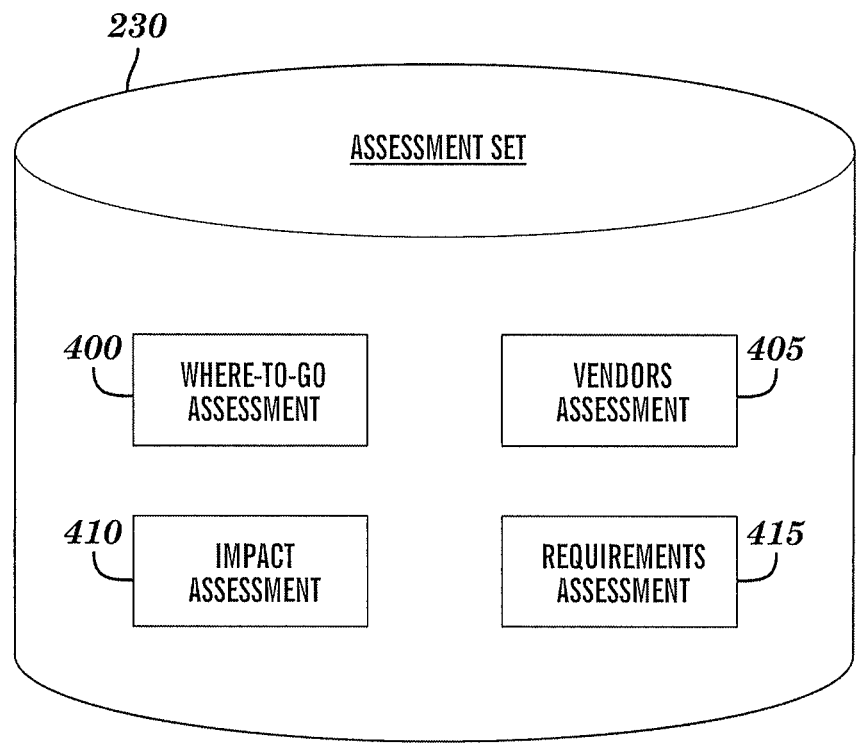
FIG. 4 is a block diagram showing an example of an assessment data set of an embodiment of the present invention.

Finally the total requirement assessment score for each of the short-listed vendors is as follows:

Total requirement assessment score=score($i$)* weight($i$)

wherein the integer i indexes the requirements and is stored for each vendor or supplier in the requirements assessment set 415 of FIG. 4.

The output of the assessment tool is a list of vendors that meet the requestor's requirements. The list may be weighted to indicate a first, second and third match etc. This is stored in the requirements assessment data set 415 as shown in FIG. 4.

The total requirements assessment score is a measure of an extent to which each vendor is able to meet specified requirements for pertaining to each subservice.

Each of the impact assessments is stored in a data store 230. This is shown in FIG. 4, wherein the totality of the impact assessments form an assessment set comprising of each of the 'where to go assessments' 400, the impact assessments 410, the vendor assessments 405 and each of the requirements assessments 415.

Figure 5:
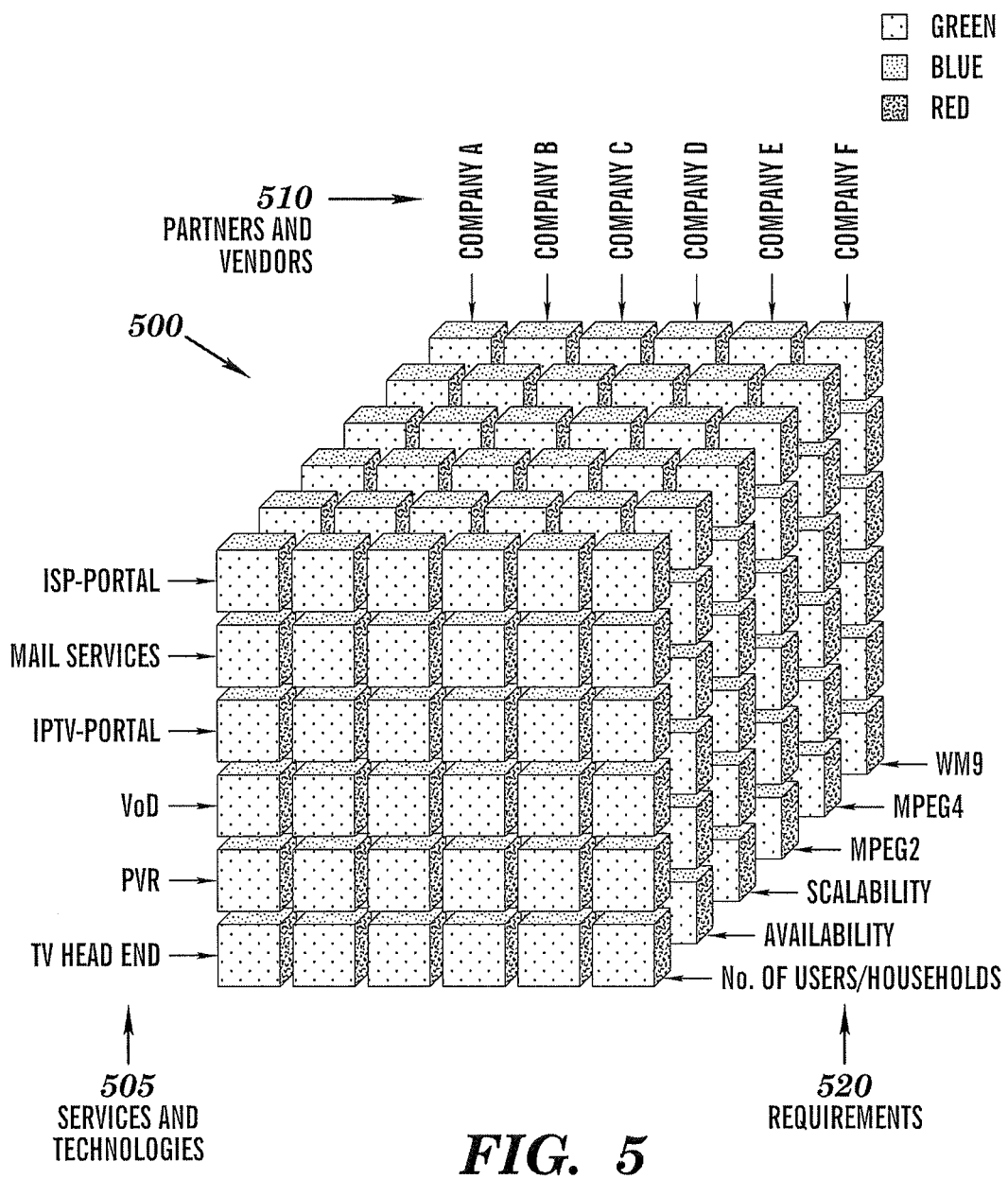
FIG. 5 shows a navigation cube for navigating three dimensional data of an embodiment of the present invention.

A visualization component 225 provides navigational functionality in the form of a navigation cube as is shown with reference to FIG. 5. The navigation cube 500 provides a framework which enables a requester to load the requested information from the selector component 210 into the navigation cube 500. The navigation cube 500 provides the ability to navigate three dimensional data. This is shown by the three axis 505, 510 and 515 of the navigation cube 500, namely vendors 510, services and technologies (i.e., subservices) 505 and requirements 520. The three axis forming in their totality the engagement set 215 for a requester's value proposition; i.e. their service or technology requirements.

The navigation cube 500 may be implemented in computer software and allows a user to manipulate and rotate the navigation cube 500 in many different directions in order to view the engagement set data through different planes.

The navigation cube 500 allows all interrelated elements (i.e., subcubes) of the navigation cube 500 to be visualized by using a chosen color (i.e., green, blue red) as represented by differential shading as indicated in FIG. 5 (as well as in FIGS. 6-9), for example, blue for partners and vendors, red for requirements and green for services and technologies.

The navigation cube 500 when loaded with an engagement set allows the viewing and inspection of the assessed numerical scores of each combination of services and technologies, partners and vendors and requirements as calculated by the assessment component. Via the navigation cube 500 is it easy to view and understand which vendors provide the most suitable match to the requestor's requirements.

Figure 6:
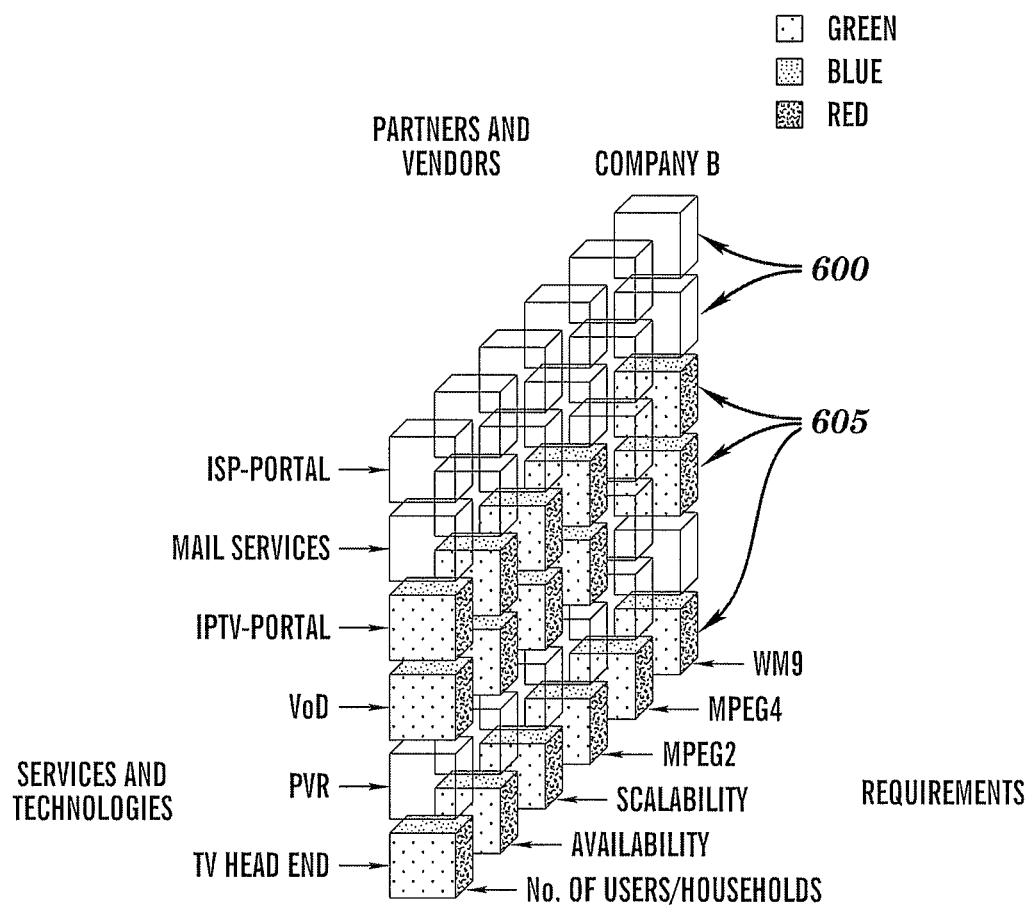
FIG. 6 illustrates a selected plane of the navigation cube in accordance with an embodiment of the present invention.

Once the navigation cube 500 has been loaded with the engagement set and assessment set, various views can be selected by viewing individual planes, vectors or single elements in order to inspect which vendor supports specific services and technologies, as is shown with reference to FIG. 6.

FIG. 6 shows a selected plane detailing the assessment results for company B. Here it is shown that there are many elements 600 which are transparent and other elements 605 which are non-transparent (e.g., have colored faces in FIG. 6). The transparent elements show there is no relevant data in which to populate the elements with and the colored elements indicating the population of data with regards to the discrete elements. For example, the colored elements 605 show that company B supports and can provide IPTV-portal services, video-on-demand services and TV head end service. The transparent elements 600 indicate the services and technologies which company B does not support or provide; i.e., ISP-portal, mail services and PVR. Each of these elements are displayed against the requirement drivers;

i.e. the number of users per household, availability, scalability, MPEG2, MPEG4 and WM9. Therefore when viewing the engagement and assessments sets through this plane of the navigation cube, one can see the company B can provide a TV head end which meets the requirements of number of users, availability, scalability, MPEG2, MPEG4 and WM9. However, when it comes to IPTV portals, company B can not provide an IP-TV portal meeting the MPEG4 requirement.

The selected plane of FIG. 6 can be turned through various aspects to provide easier viewing of certain aspects. In the example, of FIG. 7, it is clearly shown that company B only supports MPEG4 in their TV head-end offering and not for the IPTV-portal of for their VoD offering.

A user may also select only one specific service or technology of interest which is being offered by a single partner or vendor and thus a single vector can be viewed. Further, when selecting a single element, each of the assessed weightings can also be displayed.

Figure 8:
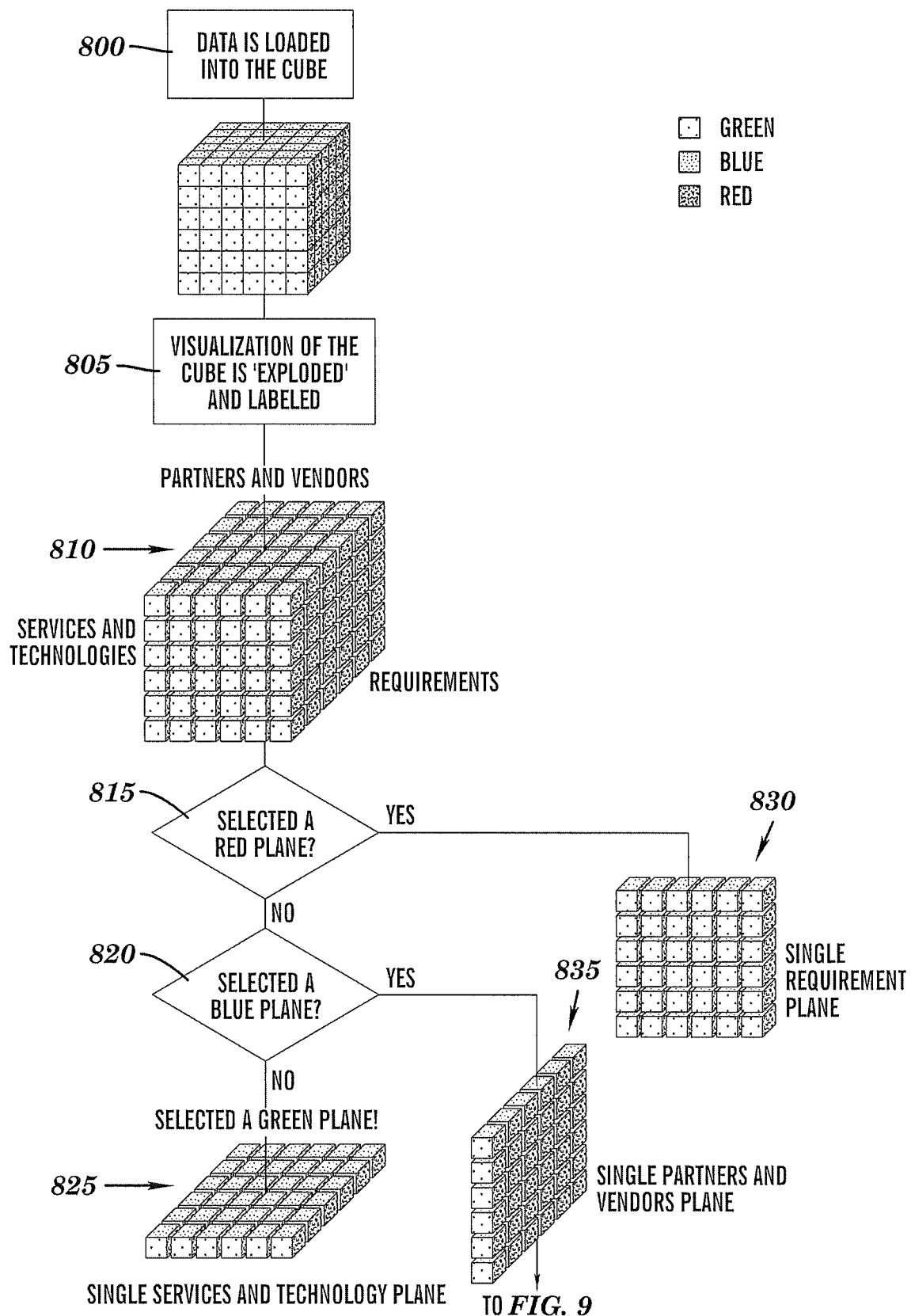
FIG. 8 is a flow chart showing the operational steps of the assessment component in accordance with an embodiment of the present invention.
Figure 9:
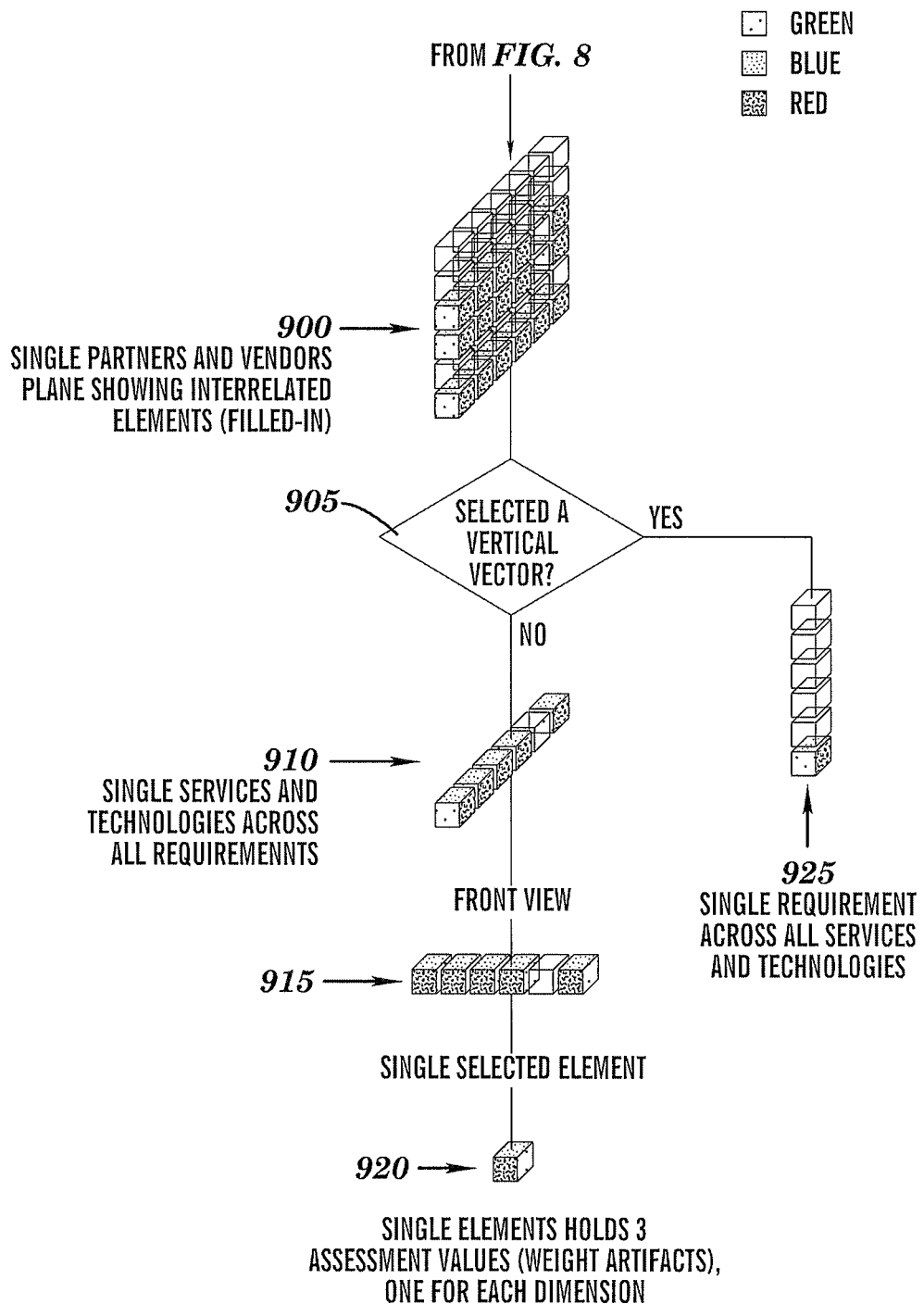
FIG. 9 shows a flow chart describing the operation steps of the navigation cube in accordance with an embodiment of the present invention.

FIGS. 8 and 9 shows a flow chart describing the operation steps of the navigation cube 500.

In FIG. 8, at step 800, an engagement set is loaded into the navigation cube 500. The navigation cube 500 is exploded and labeled at step 805 and as is shown at step 810. Once the navigation cube 500 is populated and exploded, the user can select a number of different planes to navigate through. For example, at step 815 the user can select a red plane (i.e., a Requirements plane) and navigate through the requirement drivers for that particular engagement set at step 830. Alternatively at step 820 and step 835, the user can navigate through a blue plane (i.e., a Partners and Vendors plane). At step 825, the user can navigate through a green plane (i.e., a Services and Technologies plane).

Figure 7:
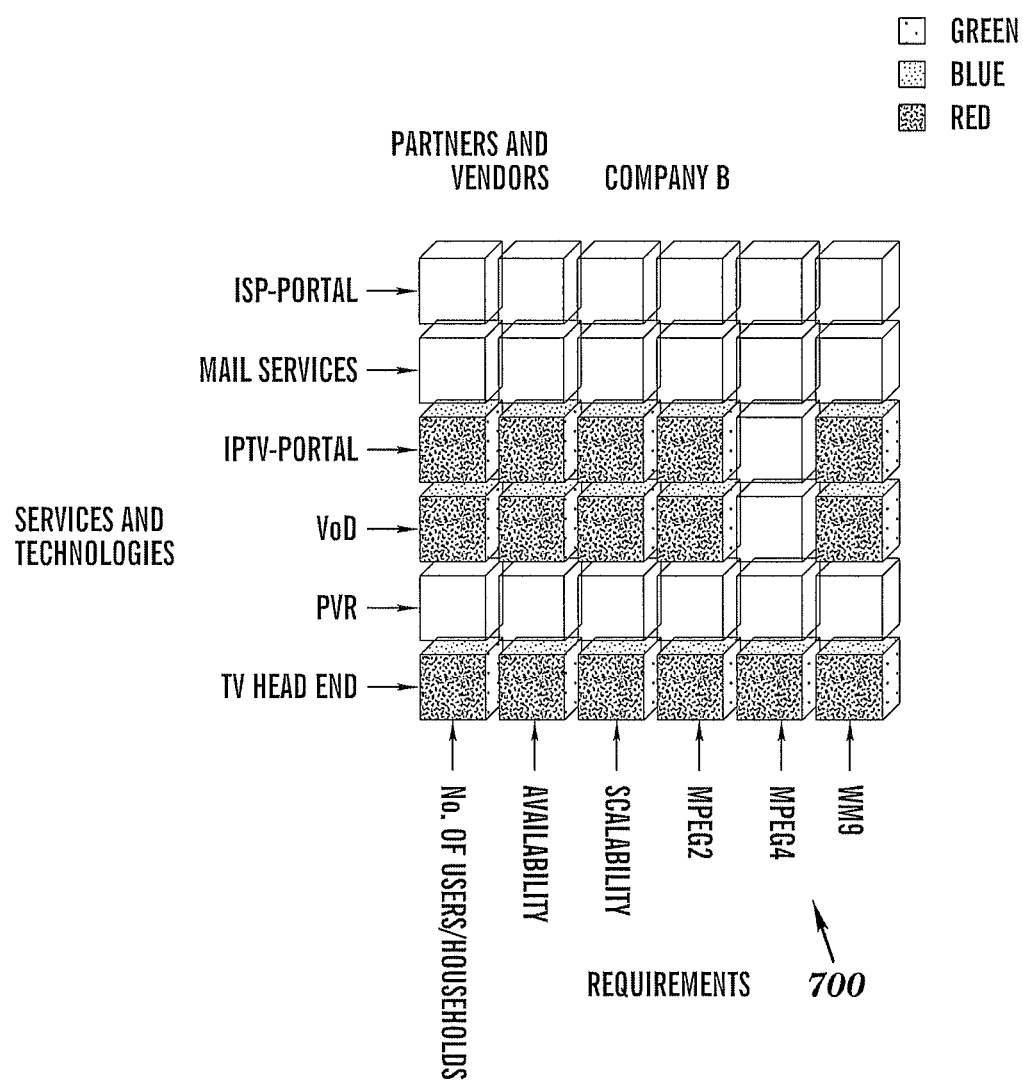
FIG. 7 illustrates another selected plane of the navigation cube in accordance with an embodiment of the present invention.

Moving onto FIG. 9, at step 900, the user whilst navigating through the services and technologies plane can navigate further and view a single partner and vendor plane showing all the interrelated elements (as shown in FIG. 7). Moving onto to step 905 and step 925, the user is also able to select a vertical vector to view a single requirement across all services and technologies. If the user does not wish to view a vertical vector, the user can instead at step 910 view a single service and technology across all requirements drivers. From this view, a single element representing a requirement driver can be selected and viewed as a single entity at step 915 and 920. Step 920 enables the user to display a single element of the vertical vector displayed at step 915 (e.g., by selecting the single element with a selection device such as by clicking a mouse when navigating the navigational cube 500 of FIG. 5), wherein the single element holds the total impact assessment score, the total vendor assessment score, and the total requirement assessment score.

Figure 10:
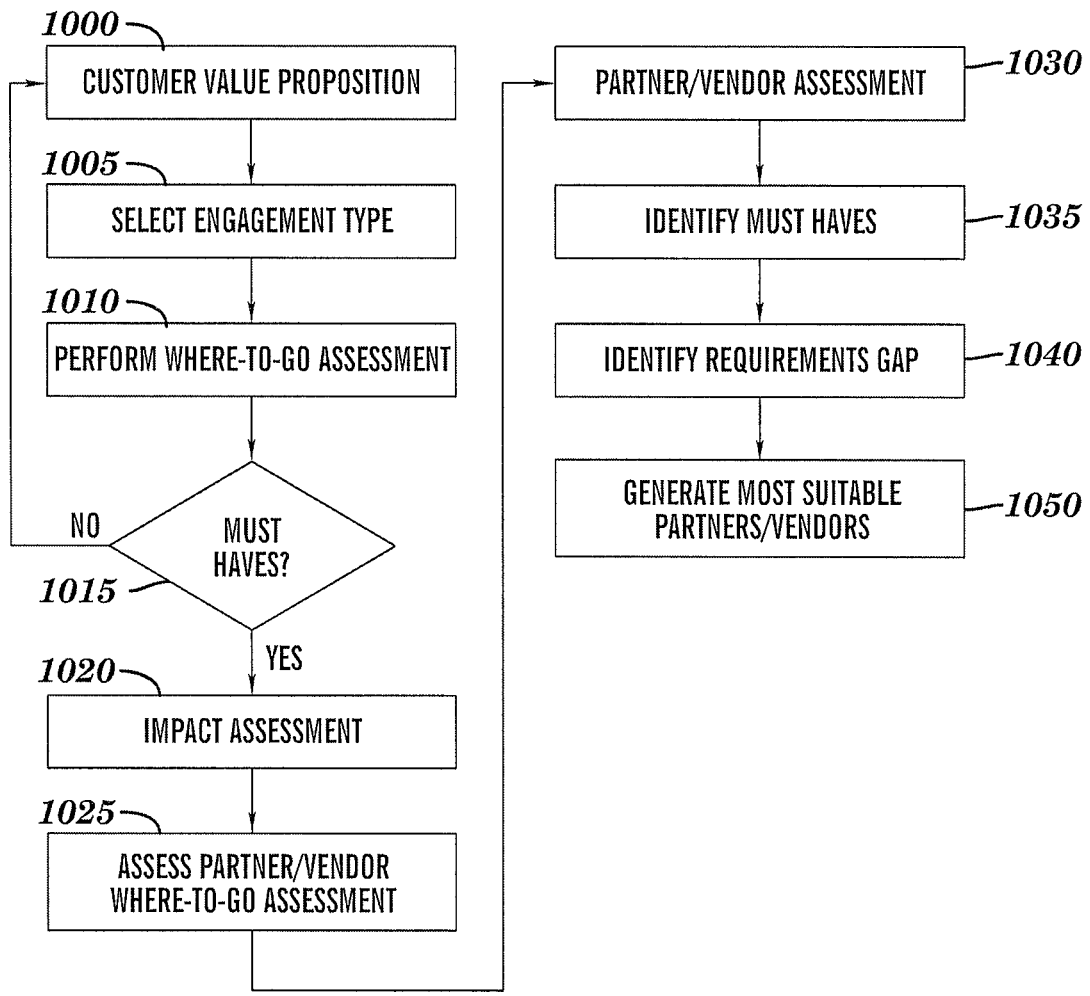
FIG. 10. shows process steps of an embodiment of the present invention.

Referring to FIG. 10, the process steps of an embodiment of the present invention are shown. At step 1000 and step 1005, the user selects the type of service they wish to implement via the selector component 210. The assessment component 225, using the selected information performs a lookup in an engagement type data store to retrieve the subservices that are required to be implemented in order to deploy the service. For each identified subservice, the assessment component 225 locates a vendor which can supply the service and vendors capabilities. At step 1010, the assessment component 225 performs a 'where-to-go' assessment to determine a set of 'must have' services and technologies. If the assessment component can not generate any 'must have' technologies and or services at determination 1015, control moves back to step 1000 and the user is required to enter further information. However, if the assessment component can generate at least one 'must have', control moves to step 1020 and the assessment component performs an impact assessment in order to compute an absolute score index which is stored in the data store 230.

Next in steps 1025 and 1030 the assessment engine 225 performs a where-to-go assessment on each vendor identified as offering one of the 'must have' services or technologies in order at step 530. At step 1035 a determination is made to identify whether any partner and/or vendors provide any 'must have' services or technologies. If the determination is positive, control moves to step 1040 and the 'where-to-go' requirements are calculated and weighted as explained previously and stored in the assessment set data store along with the other calculations and weightings. At step 1050 a list is generated or the data is loaded into the navigation cube detailing the partners and vendors whom are can meet the requestor's requirements.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for using a graphical user interface (GUI) for display and navigation of a three-dimensional navigational cube to assess vendors of varying capability for meeting requirements of a service provider for deploying a selected service in a service delivery environment, said method comprising:

a processor of a computer system generating and displaying, by a display device of the computer system, to a user a three-dimensional navigational cube configured to be navigated, said navigational cube aligned along three mutually orthogonal axes that include a first axis, a second axis, and a third axis, wherein subservices of a plurality of subservices that the service provider must have in order for the service provider to implement the selected service, vendors able to implement at least one subservice of the plurality of subservices, and requirements stipulated by the service provider that are to be met for implementing the plurality of subservices by the plurality of vendors are respectively represented on the first axis, the second axis, and the third axis to define a subcube at each unique combination of subservice, vendor, and requirement, wherein said displaying the navigational cube comprises displaying each subcube as being transparent or non-transparent such that the displayed subcubes comprise at least one transparent subcube and one or more non-transparent subcubes, wherein each transparent subcube denotes an indication that said each vendor on the second axis is unable to meet said each requirement on the third axis for implementing said each subservice on the first axis, wherein each non-transparent subcube denotes an indication that said each vendor on the second axis is able to meet said each requirement on the third axis for implementing said each subservice on the first axis, wherein each face of each non-transparent subcube is orthogonal to the first axis, the second axis, or the third axis and is colored with a first color, a second color, and a third color, respectively, and as a consequence, each face of the navigational cube that is orthogonal to the first axis, the second axis, or the third axis is colored with the first color, the second color, or the third color, respectively, and wherein the first color, the second color, and the third color are different colors;

after said displaying the navigational cube, said processor receiving a selection on the display device, from the user, of one or more planar sections of the navigational cube, wherein each selected planar section is independently orthogonal to the first axis, the second axis, or the third axis and is characterized by the subservices, the vendors, or the requirements, respectively, having a same value for each subcube in each planar section;

in response to said receiving the selection of each planar section, said processor generating and displaying, by the display device, to the user an image of each selected planar section by isolating each selected planar section within the navigational cube and transforming each isolated selected planar section to the displayed image of each isolated selected planar section, wherein said displaying each selected planar section comprises depicting each subcube in each selected planar section as being transparent or non-transparent and displaying each exposed face of each non-transparent subcube in each selected planar section as colored with the first color, the second color, or the third color if each selected planar section is orthogonal to the first axis, the second axis, or the third axis, respectively;

after said displaying the image of one planar section of the one or more selected planar sections, said processor receiving a selection on the display device, from the user, of a vector of co-linear subcubes within the one planar section, wherein if the one planar section is orthogonal to the first axis, the second axis, or the third axis, then the selected vector of co-linear subcubes is parallel to either the second or third axis, the first or third axis, or the first or second axis, respectively;

in response to said receiving the selection of the vector of co-linear subcubes, said processor generating and displaying, by the display device, to the user an image of the selected vector of co-linear subcubes;

after said displaying the image of the selected vector of co-linear subcubes, said processor receiving a selection on the display device, from the user, of anon-transparent single subcube within the selected vector of co-linear subcubes which selects a vendor able to meet requirements for implementing the subservice for the selected non-transparent single subcube, wherein the single subcube holds a total impact assessment score, a total vendor assessment score, and a total requirement assessment score respectively pertaining to an impact on specified impact criteria of the subservice, the vendor, and the requirement associated with the single subcube; and in response to said receiving the selection of the single subcube, said processor generating and displaying, by the display device, to the user an image of the selected single subcube, including displaying the total impact assessment score, the total vendor assessment score, and the total requirement assessment score respectively pertaining to the impact of the subservice, the vendor, and the requirement associated with the single subcube.

2. The method of claim 1, said method further comprising: displaying a selected vector of the navigational cube, wherein the selected vector is oriented parallel to the first axis, the second axis, or the third axis.

3. The method of claim 1, wherein the one or more planar sections of the navigational cube is a plurality of planar sections of the navigational cube.

4. The method of claim 1, wherein each subcube having an associated subservice, vendor, and requirement stores an associated first measure of an impact on specified impact criteria of implementing each subservice, second measure of an extent to which each vendor is able to meet specified targets for specified vendor assessment criteria with respect to each subservice, and third measure of an extent to which each vendor is able to meet each requirement for implementing each subservice, and wherein each subcube is configured to display its stored first measure, second measure, and third measure upon being selected by a selection device.

5. The method of claim 4, said method further comprising:
said processor performing an impact assessment for each subservice to determine the first measure of the impact on specified impact criteria of implementing each subservice;
said processor performing a vendors assessment for each subservice to determine the second measure of the extent to which each vendor is able to meet specified targets for specified vendor assessment criteria with respect to each subservice; and
said processor performing a requirements assessment to determine the third measure of the extent to which each vendor is able to meet each requirement for implementing each subservice.

6. The method of claim 5,
wherein the first measure is the total impact assessment score that is equal to a summation over a product of each impact criterion and a weight assigned to each impact criterion;
wherein the second measure is the total vendor assessment score that is equal to a summation over a product of a difference between a target and actual value of each vendor assessment criterion and a weight assigned to each vendor assessment criterion, wherein the vendor assessment criteria include a plurality of vender characteristics, and wherein each vendor characteristic is selected from the group consisting of completeness of the vendor's service, competence of the vendor, quality of service and support provided by the vendor, the vendor's reputation, the vendor's references, the vendor's openness, and the vendor's relationship with the vendor's clients; and
wherein the third measure is a plurality of total requirement assessment scores, wherein each total requirement assessment score is specific to a respective requirement of the plurality of requirements and is equal to a product of a score indicative of each vendor's ability to meet the respective requirement and a weight assigned to the respective requirement pertaining to each subservice.

7. The method of claim 5, said method further comprising:
said processor storing the first measure, the second measure, and the third measure in a data store of the computer system.

8. A computer program product, comprising a computer readable hardware storage device storing software code portions that, upon being executed on a processor of a computer system, perform a method for using a graphical user interface (GUI) for display and navigation of a three-dimensional navigational cube to assess vendors of varying capability for meeting requirements of a service provider for deploying a selected service in a service delivery environment, said method comprising:
said processor generating and displaying, by a display device of the computer system, to a user a three-dimensional navigational cube configured to be navigated, said navigational cube aligned along three mutually orthogonal axes that include a first axis, a second axis, and a third axis, wherein subservices of a plurality of subservices that the service provider must have in order for the service provider to implement the selected service, vendors able to implement at least one subservice of the plurality of subservices, and requirements stipulated by the service provider that are to be met for implementing the plurality of subservices by the plurality of vendors are respectively represented on the first axis, the second axis, and the third axis to define a subcube at each unique combination of subservice, vendor, and requirement, wherein said displaying the navigational cube comprises displaying each subcube as being transparent or non-transparent such that the displayed subcubes comprise at least one transparent subcube and one or more non-transparent subcubes, wherein each transparent subcube denotes an indication that said each vendor on the second axis is unable to meet said each requirement on the third axis for implementing said each subservice on the first axis, wherein each non-transparent subcube denotes an indication that said each vendor on the second axis is able to meet said each requirement on the third axis for implementing said each subservice on the first axis, wherein each face of each non-transparent subcube is orthogonal to the first axis, the second axis, or the third axis and is colored with a first color, a second color, and a third color, respectively, and as a consequence, each face of the navigational cube that is orthogonal to the first axis, the second axis, or the third axis is colored with the first color, the second color, or the third color, respectively, and wherein the first color, the second color, and the third color are different colors;

after said displaying the navigational cube, said processor receiving a selection on the display device, from the user, of one or more planar sections of the navigational cube, wherein each selected planar section is independently orthogonal to the first axis, the second axis, or the third axis and is characterized by the subservices, the vendors, or the requirements, respectively, having a same value for each subcube in each planar section;

in response to said receiving the selection of each planar section, said processor generating and displaying, by the display device, to the user an image of each selected planar section by isolating each selected planar section within the navigational cube and transforming each isolated selected planar section to the displayed image of each isolated selected planar section, wherein said displaying each selected planar section comprises depicting each subcube in each selected planar section as being transparent or non-transparent and displaying each exposed face of each non-transparent subcube in each selected planar section as colored with the first color, the second color, or the third color if each selected planar section is orthogonal to the first axis, the second axis, or the third axis, respectively;

after said displaying the image of one planar section of the one or more selected planar sections, said processor receiving a selection on the display device, from the user, of a vector of co-linear subcubes within the one planar section, wherein if the one planar section is orthogonal to the first axis, the second axis, or the third axis, then the selected vector of co-linear subcubes is parallel to either the second or third axis, the first or third axis, or the first or second axis, respectively;

in response to said receiving the selection of the vector of co-linear subcubes, said processor generating and displaying, by the display device, to the user an image of the selected vector of co-linear subcubes;

after said displaying the image of the selected vector of co-linear subcubes, said processor receiving a selection on the display device, from the user, of a non-transparent single subcube within the selected vector of co-linear subcubes which selects a vendor able to meet requirements for implementing the subservice for the selected non-transparent single subcube, wherein the single subcube holds a total impact assessment score, a total vendor assessment score, and a total requirement assessment score respectively pertaining to an impact on specified impact criteria of the subservice, the vendor, and the requirement associated with the single subcube; and in response to said receiving the selection of the single subcube, said processor generating and displaying, by the display device, to the user an image of the selected single subcube, including displaying the total impact assessment score, the total vendor assessment score, and the total requirement assessment score respectively pertaining to the impact of the subservice, the vendor, and the requirement associated with the single subcube.

9. The computer program product of claim 8, said method further comprising:

displaying a selected vector of the navigational cube, wherein the selected vector is oriented parallel to the first axis, the second axis, or the third axis.

10. The computer program product of claim 8, wherein the one or more planar sections of the navigational cube is a plurality of planar sections of the navigational cube.

11. The computer program product of claim 8, wherein each subcube having an associated subservice, vendor, and requirement stores an associated first measure of an impact on specified impact criteria of implementing each subservice, second measure of an extent to which each vendor is able to meet specified targets for specified vendor assessment criteria with respect to each subservice, and third measure of an extent to which each vendor is able to meet each requirement for implementing each subservice, and wherein each subcube is configured to display its stored first measure, second measure, and third measure upon being selected by a selection device.

12. The computer program product of claim 11, said method further comprising:

said processor performing an impact assessment for each subservice to determine the first measure of the impact on specified impact criteria of implementing each subservice;

said processor performing a vendors assessment for each subservice to determine the second measure of the extent to which each vendor is able to meet specified targets for specified vendor assessment criteria with respect to each subservice; and said processor performing a requirements assessment to determine the third measure of the extent to which each vendor is able to meet each requirement for implementing each subservice.

13. The computer program product of claim 12, wherein the first measure is the total impact assessment score that is equal to a summation over a product of each impact criterion and a weight assigned to each impact criterion;

wherein the second measure is the total vendor assessment score that is equal to a summation over a product of a difference between a target and actual value of each vendor assessment criterion and a weight assigned to each vendor assessment criterion, wherein the vendor assessment criteria include a plurality of vender characteristics, and wherein each vendor characteristic is selected from the group consisting of completeness of the vendor's service, competence of the vendor, quality of service and support provided by the vendor, the vendor's reputation, the vendor's references, the vendor's openness, and the vendor's relationship with the vendor's clients; and wherein the third measure is a plurality of total requirement assessment scores, wherein each total requirement assessment score is specific to a respective requirement of the plurality of requirements and is equal to a product of a score indicative of each vendor's ability to meet the respective requirement and a weight assigned to the respective requirement pertaining to each subservice.

14. The computer program product of claim 12, said method further comprising:

said processor storing the first measure, the second measure, and the third measure in a data store of the computer system.

15. A computer system comprising a processor and a computer readable memory device coupled to the processor, said memory device containing software code portions that when executed by the processor implement a method for using a graphical user interface (GUI) for display and navigation of a three-dimensional navigational cube to assess vendors of varying capability for meeting requirements of a service provider for deploying a selected service in a service delivery environment, said method comprising:

said processor generating and displaying, by a display device of the computer system, to a user a three-dimensional navigational cube configured to be navigated, said navigational cube aligned along three mutually orthogonal axes that include a first axis, a second axis, and a third axis, wherein subservices of a plurality of subservices that the service provider must have in order for the service provider to implement the selected service, vendors able to implement at least one subservice of the plurality of subservices, and requirements stipulated by the service provider that are to be met for implementing the plurality of subservices by the plurality of vendors are respectively represented on the first axis, the second axis, and the third axis to define a subcube at each unique combination of subservice, vendor, and requirement, wherein said displaying the navigational cube comprises displaying each subcube as being transparent or non-transparent such that the displayed subcubes comprise at least one transparent subcube and one or more non-transparent subcubes, wherein each transparent subcube denotes an indication that said each vendor on the second axis is unable to meet said each requirement on the third axis for implementing said each subservice on the first axis, wherein each non-transparent subcube denotes an indication that said each vendor on the second axis is able to meet said each requirement on the third axis for implementing said each subservice on the first axis, wherein each face of each non-transparent subcube is orthogonal to the first axis, the second axis, or the third axis and is colored with a first color, a second color, and a third color, respectively, and as a consequence, each face of the navigational cube that is orthogonal to the first axis, the second axis, or the third axis is colored with the first color, the second color, or the third color, respectively, and wherein the first color, the second color, and the third color are different colors;

after said displaying the navigational cube, said processor receiving a selection on the display device, from the user, of one or more planar sections of the navigational cube, wherein each selected planar section is independently orthogonal to the first axis, the second axis, or the third axis and is characterized by the subservices, the vendors, or the requirements, respectively, having a same value for each subcube in each planar section;

in response to said receiving the selection of each planar section, said processor generating and displaying, by the display device, to the user an image of each selected planar section by isolating each selected planar section within the navigational cube and transforming each isolated selected planar section to the displayed image of each isolated selected planar section, wherein said displaying each selected planar section comprises depicting each subcube in each selected planar section as being transparent or non-transparent and displaying each exposed face of each non-transparent subcube in each selected planar section as colored with the first color, the second color, or the third color if each selected planar section is orthogonal to the first axis, the second axis, or the third axis, respectively;

after said displaying the image of one planar section of the one or more selected planar sections, said processor receiving a selection on the display device, from the user, of a vector of co-linear subcubes within the one planar section, wherein if the one planar section is orthogonal to the first axis, the second axis, or the third axis, then the selected vector of co-linear subcubes is parallel to either the second or third axis, the first or third axis, or the first or second axis, respectively;

in response to said receiving the selection of the vector of co-linear subcubes, said processor generating and displaying, by the display device, to the user an image of the selected vector of co-linear subcubes;

after said displaying the image of the selected vector of co-linear subcubes, said processor receiving a selection on the display device, from the user, of a non-transparent single subcube within the selected vector of co-linear subcubes which selects a vendor able to meet requirements for implementing the subservice for the selected non-transparent single subcube, wherein the single subcube holds a total impact assessment score, a total vendor assessment score, and a total requirement assessment score respectively pertaining to an impact on specified impact criteria of the subservice, the vendor, and the requirement associated with the single subcube; and in response to said receiving the selection of the single subcube, said processor generating and displaying, by the display device, to the user an image of the selected single subcube, including displaying the total impact assessment score, the total vendor assessment score, and the total requirement assessment score respectively pertaining to the impact of the subservice, the vendor, and the requirement associated with the single subcube.

16. The computer system of claim 15, said method further comprising:

displaying a selected vector of the navigational cube, wherein the vector is oriented parallel to the first axis, the second axis, or the third axis.

17. The computer system of claim 15, wherein the one or more planar sections of the navigational cube is a plurality of planar sections of the navigational cube.

18. The computer system of claim 15, wherein each subcube having an associated subservice, vendor, and requirement stores an associated first measure of an impact on specified impact criteria of implementing each subservice, second measure of an extent to which each vendor is able to meet specified targets for specified vendor assessment criteria with respect to each subservice, and third measure of an extent to which each vendor is able to meet each requirement for implementing each subservice, and wherein each subcube is configured to display its stored first measure, second measure, and third measure upon being selected by a selection device.

19. The computer system of claim 18, said method further comprising:
    said processor performing an impact assessment for each subservice to determine the first measure of the impact on specified impact criteria of implementing each subservice;
    said processor performing a vendors assessment for each subservice to determine the second measure of the extent to which each vendor is able to meet specified targets for specified vendor assessment criteria with respect to each subservice; and
    said processor performing a requirements assessment to determine the third measure of the extent to which each vendor is able to meet each requirement for implementing each subservice.

20. The computer system of claim 19,
    wherein the first measure is the total impact assessment score that is equal to a summation over a product of each impact criterion and a weight assigned to each impact criterion;
    wherein the second measure is the total vendor assessment score that is equal to a summation over a product of a difference between a target and actual value of each vendor assessment criterion and a weight assigned to each vendor assessment criterion, wherein the vendor assessment criteria include a plurality of vender characteristics, and wherein each vendor characteristic is selected from the group consisting of completeness of the vendor's service, competence of the vendor, quality of service and support provided by the vendor, the vendor's reputation, the vendor's references, the vendor's openness, and the vendor's relationship with the vendor's clients; and
    wherein the third measure is a plurality of total requirement assessment scores, wherein each total requirement assessment score is specific to a respective requirement of the plurality of requirements and is equal to a product of a score indicative of each vendor's ability to meet the respective requirement and a weight assigned to the respective requirement pertaining to each subservice.

* * * * *